United States Patent
Guo et al.

(10) Patent No.: US 10,402,391 B2
(45) Date of Patent: Sep. 3, 2019

(54) PROCESSING METHOD, DEVICE AND SYSTEM FOR DATA OF DISTRIBUTED STORAGE SYSTEM

(71) Applicant: ZTE CORPORATION, Guangdong (CN)

(72) Inventors: Bin Guo, Guangdong (CN); Zhenghua Chen, Guangdong (CN); Yinjun Han, Guangdong (CN); Hong Gao, Guangdong (CN); Ning Cheng, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 599 days.

(21) Appl. No.: 15/028,545

(22) PCT Filed: Apr. 1, 2014

(86) PCT No.: PCT/CN2014/074556
§ 371 (c)(1),
(2) Date: Apr. 11, 2016

(87) PCT Pub. No.: WO2014/176954
PCT Pub. Date: Nov. 6, 2014

(65) Prior Publication Data
US 2016/0299820 A1    Oct. 13, 2016

(30) Foreign Application Priority Data
Oct. 11, 2013    (CN) .......................... 2013 1 0474020

(51) Int. Cl.
*G06F 16/21*    (2019.01)
*G06F 16/23*    (2019.01)
(Continued)

(52) U.S. Cl.
CPC ...... *G06F 16/2365* (2019.01); *G06F 11/1451* (2013.01); *G06F 16/211* (2019.01); *G06F 16/258* (2019.01); *H04L 67/1097* (2013.01)

(58) Field of Classification Search
CPC ......... G06F 17/30292; G06F 17/30371; G06F 17/30569; G06F 11/1469; G06F 11/1451;
(Continued)

(56) References Cited

U.S. PATENT DOCUMENTS 7,028,028 B1 * 4/2006 Balmin ............. G06F 17/30917
707/760
2004/0254953 A1 * 12/2004 Vincent, III ........ G06F 17/2247
(Continued)

FOREIGN PATENT DOCUMENTS

CN    101488104    7/2009
CN    102694828    9/2012
(Continued)

OTHER PUBLICATIONS

International Search Report for PCT/CN2014/074556, dated Jul. 2, 2014, 4 pages.

*Primary Examiner* — James Trujillo
*Assistant Examiner* — Jessica N Le
(74) *Attorney, Agent, or Firm* — Nixon & Vanderhye P.C.

(57) ABSTRACT

The disclosure provides a processing method, device and system for data of a distributed storage system. The method includes: acquiring a first schema structure of target data and a second schema structure of source data; and processing the source data into structural data of the first schema structure according to the first schema structure and the second schema structure. The disclosure solves a problem that a data schema structure in a distributed storage system in related arts is inflexible to be described. There is a beneficial
(Continued)

effect of improving description flexibility of the data schema structure so as to improve data processing efficiency.

5 Claims, 7 Drawing Sheets

(51) Int. Cl.
 *G06F 16/25* (2019.01)
 *G06F 11/14* (2006.01)
 *H04L 29/08* (2006.01)
(58) Field of Classification Search
 CPC ............ G06F 16/2111; G06F 16/2365; G06F 16/258; H04L 67/1097
 USPC .......................................................... 707/681
 See application file for complete search history.

(56) References Cited

U.S. PATENT DOCUMENTS

| | | | | |
|---|---|---|---|---|
| 2007/0038702 | A1* | 2/2007 | Taylor | G06Q 10/107 709/206 |
| 2007/0203923 | A1* | 8/2007 | Thomas | G06F 17/30917 |
| 2008/0320012 | A1* | 12/2008 | Loving | G06F 17/30297 |
| 2010/0274821 | A1* | 10/2010 | Bernstein | G06F 17/30864 707/808 |
| 2012/0078913 | A1* | 3/2012 | Muni | G06F 17/303 707/740 |

FOREIGN PATENT DOCUMENTS

| | | | | |
|---|---|---|---|---|
| CN | 103064635 | | 4/2013 | |
| EP | 1990740 | A1 * | 11/2008 | ........... G06F 17/303 |
| EP | 2434729 | | 3/2012 | |

\* cited by examiner

PROCESSING METHOD, DEVICE AND SYSTEM FOR DATA OF DISTRIBUTED STORAGE SYSTEM

CROSS-REFERENCES TO RELATED APPLICATIONS

This application is the U.S. national phase of International Application No. PCT/CN2014/074556 filed Apr. 1, 2014, which designated the U.S. and claims priority to Chinese Patent Application No. 201310474020.8, titled "PROCESSING METHOD, DEVICE AND SYSTEM FOR DATA OF DISTRIBUTED STORAGE SYSTEM", filed on Oct. 11, 2013, the entire contents of each of which are hereby incorporated by reference.

TECHNICAL FIELD

The disclosure relates to the field of communications, and particularly relates to a processing method, device and system for data of a distributed storage system.

TECHNICAL BACKGROUND

Cloud computing is a product of development and integration of traditional computer technologies and network technologies, such as grid computing, distributed computing, parallel computing, utility computing, network storage, virtualization, and load balance, and is aiming to integrate multiple computing entities with relatively low cost into a system with great computing capability via networks. Distributed storage is one field in cloud computing category, and has effects of providing the distributed storage service of mass data and high-speed read and write access capability.

Data have schema structures. In a relational database, schema structures of data are maintained by a database. However, schema structures of data are not perceived in a non-relational data storage system. As a result, when data are stored, the data are converted into binary data streams according to the schema structure, and then are stored into a distributed storage system; when data are read, the binary data streams are taken out from the distributed storage system, and are restored into usable data according to a certain rule. The data conversion and restoration above are generally called as data serialization and deserialization processes.

In distributed applications, a writer of data and a reader of data are possibly not a same program. If a data schema structure never changes, the reader can restore the data of the writer correctly at any time according to the reader's own local data schema structure. But, with upgrade of programs, data schema structures are normally changed, while massive data are always stored in the distributed storage, and it is hard to read out and modify all the data schema structures in a short period of time; in addition, in certain scenes, it is required to keep no interruption of service is required to be kept in an upgrading process, and writers and readers of different versions would occur at the same time. At this moment, a key problem which is relatively difficult to solve is how a data reader restore data of any writer. A feature capable of restoring data of any writer is generally called as schema-free.

In relevant technical schemes, the schema-free is generally realized by following schemes:

Scheme 1: a field is fixed in a data schema structure to represent a version of data, but there is a shortage that newly increased content of a new version can only be increased to an end of an old version, and readers need to achieve restoration methods of schema structures of all known versions;

Scheme 2: a traditional tag-length-value method, in which the tag, length and binary data streams (value) of each field in a data schema structure are recorded sequentially, but there is a shortage that no complex data structure can be represented, especially a nested structure.

Scheme 3: a self-description notation, such as a JAVA script object notation (short for JSON). There is a advantage that any complex data schema structure can be represented, but there is a shortage that the self-description notation is an interpreted data description mode with low efficiency.

Currently, no effective solution has been proposed as to a problem that a data schema structure in a distributed storage system in related art is inflexible to be described.

SUMMARY

Embodiments of the disclosure provide a processing method, device and system for data of a distributed storage system so as to at least solve the problem above.

According to one aspect of embodiments of the disclosure, a processing method for data of the distributed storage system is provided, and includes the steps: acquiring a first schema structure of target data and a second schema structure of source data; and processing the source data into structural data of the first schema structure according to the first schema structure and the second schema structure.

According to another aspect of embodiments of the disclosure, a data processing device of the distributed storage system is provided, and includes an acquiring module configured to acquire a first schema structure of target data and a second schema structure of source data, and a restoration module configured to process the source data into structural data of the first schema structure according to the first schema structure and the second schema structure.

According to another aspect of embodiments of the disclosure, a data processing device of the distributed storage system is provided, and includes a schema acquiring module configured to acquire the schema structure of the source data and the identification of the schema structure. The source data are to-be-written data, and a write module configured to write the source data into the storage space according to the schema structure, and write the identification into the storage space.

According to another aspect of embodiments of the disclosure, a data processing system of the distributed storage system is provided, and includes a distributed storage data storage server configured to store data, a distributed storage schema management server, configured to manage the schema structure of the data; and configured to write data to the distributed storage data storage server according to the schema structure; the device according to any of the eleventh scheme to thirteenth scheme, configured to read data from the distributed storage scheme management server according to the schema structure.

According to embodiments of the disclosure, the technical scheme is adopted: the first schema structure for acquiring target data, a second schema structure for acquiring source data and the structural data for processing the source data into the first schema structure according to the first schema structure and the second schema structure are used for solving the problem of inflexible data schema structure description in the distributed storage system in the related art, and have the beneficial effects of enhancing the flexible description of the data schema structure, thereby enhancing the data processing efficiency.

DESCRIPTION OF DRAWINGS

The described drawings are used for providing further understanding of the disclosure, and constitute one part of the application, and the schematic embodiments of the disclosure and the description thereof are used for explaining the disclosure, and do not constitute inappropriate limit to the disclosure. In the drawings.

DETAILED DESCRIPTION OF EMBODIMENT

The disclosure is described in conjunction with referenced drawings and embodiments in the context below. It should be noted that embodiments in the application and the features in embodiments can be combined with each other under the condition of no interference.

Figure 1:
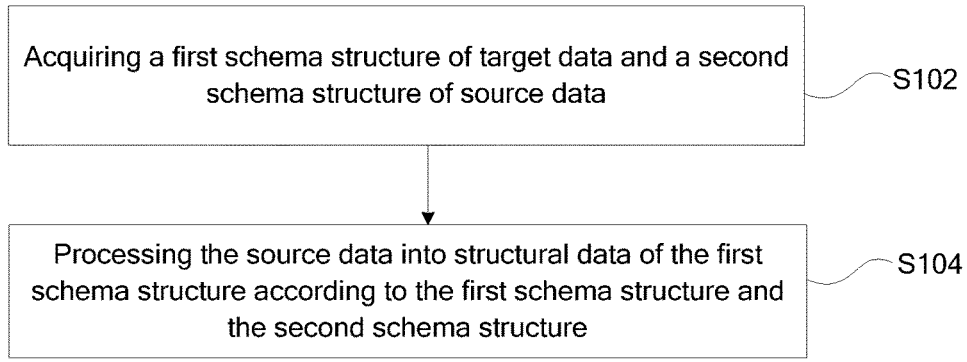
FIG. 1 is a flow diagram showing a processing method 1 for data of a distributed storage system according to embodiments of the disclosure.

Embodiments of the disclosure provide a processing method for a distributed storage system. FIG. 1 is a schematic diagram showing a processing method 1 for data of a distributed storage system according to embodiments of the disclosure. As shown in FIG. 1, the flow includes following steps:

Step S102, acquiring a first schema structure of target data and a second schema structure of source data; and Step S104, processing the source data into structural data of the first schema structure according to the first schema structure and the second schema structure.

The steps above solve a problem that a data schema structure in a distributed storage system in related art is inflexible to be described. There is a beneficial effect of improving description flexibility of the data schema structure so as to improve data processing efficiency.

In an implementation mode of embodiments of the disclosure, the first schema structure is a text description to schema structures of each element in the target data, and the second schema structure is a text description to schema structures of each element in the source data. The text description of the first schema structure includes at least one of the following: names of each element in the target data, types of each element in the target data, legal value ranges of each element in the target data, nest relations of each element in the target data, and a sequence of each element in the target data; and/or the text description of the second schema structure includes at least one of the following: names of each element in the source data, types of each element in the source data, legal value ranges of each element in the source data, nest relations of each element in the source data, and a sequence of each element in the source data. Schema structures of the target data can be defined in advance by the above steps so as to achieve data schema-free.

In another implementation mode of embodiments of the disclosure, processing the source data into structural data of the first schema structure according to the first schema structure and the second schema structure, may include: judging whether the first schema structure and the second schema structure are consistent, processing the source data into the structural data according to the first schema structure or the second schema structure when a judging result is that the first schema structure and the second schema structure are consistent; determining differences between the first schema structure and the second schema structure, and processing the source data into structural data according to the first schema structure, the second schema structure and the differences when the judging result is that the first schema structure and the second schema structure are inconsistent. By the steps above, not only description of the data schema structure is more flexible, but also data reading efficiency is higher.

In another implementation mode of embodiments of the disclosure, judging whether the first schema structure and the second schema structure are consistent, may include: comparing a first identification number of the first schema structure with a second identification number of the second schema structure. The first schema structure and the second schema structure are consistent if the first identification number is consistent with the second identification number; the first schema structure and the second schema structure are inconsistent if the first identification number and the second identification number are inconsistent. The first identification number and the second identification number are uniformly assigned by a distributed storage schema management server. By the steps above, data schema structures can be managed centrally, so that data processing efficiency is improved.

In another implementation mode of embodiments of the disclosure, when data are written in a storage space, the target data are data supported by the storage space, and the source data are to-be-written data; and/or when data are read from the storage space, the target data are data to be obtained by reading, and the source data are data stored in the storage space.

Figure 2:
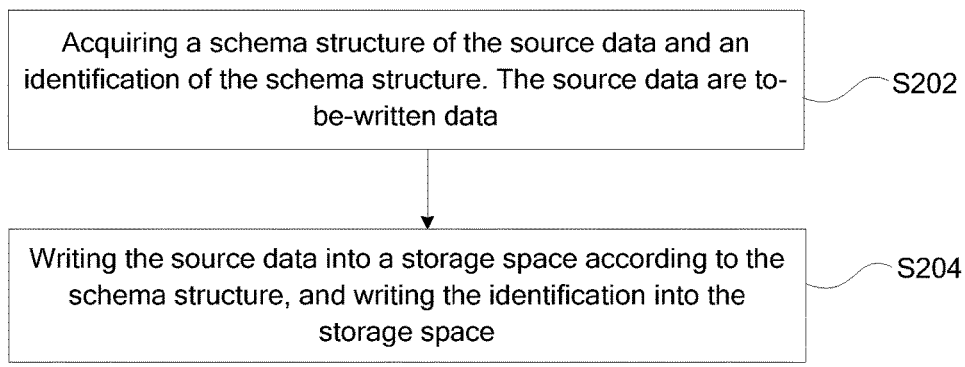
FIG. 2 is a flow diagram showing a processing method 2 for data of the distributed storage system according to embodiments of the disclosure.

Embodiments of the disclosure further provide a processing method for data of a distributed storage system. FIG. 2 is a flow diagram showing a data processing method 2 according to embodiments of the disclosure. As shown in FIG. 2, the flow includes following steps:

Step S202, acquiring a schema structure of the source data and an identification of the schema structure. The source data are to-be-written data;

Step S204, writing the source data into a storage space according to the schema structure, and writing the identification into the storage space.

Alternatively, the schema structure is a text description of schema structures of each element in the source data.

Alternatively, the text description includes at least one of the following: names of each element, types of each element, legal value ranges of each element, nest relations of each element, and a sequence of each element.

Alternatively, acquiring a schema structure of the source data and an identification of the schema structure, includes: generating the schema structure; sending the schema structure to a distributed storage schema management server; and receiving the identification returned by the distributed storage schema management server according to the schema structure. Under the condition that the schema structure is matched in local existing schema structures by the distributed storage schema management server, the identification is a matched identification of the existing schema structures, otherwise the identification is a newly assigned identification.

Figure 3:
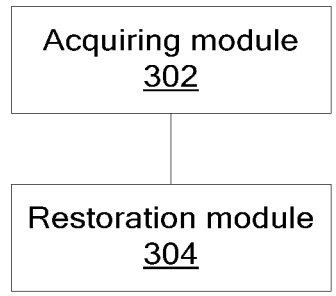
FIG. 3 is a structure schematic diagram showing a data processing device 1 of a distributed storage system according to embodiments of the disclosure.

Embodiments of the disclosure further provide a data processing device of a distributed storage system. FIG. 3 is a structure schematic diagram showing a data processing device 1 of a distributed storage system according to embodiments of the disclosure. As shown in FIG. 3, the device includes an acquiring module 302 configured to acquire a first schema structure of target data and a second schema structure of source data, and a restoration module 304 configured to process the source data into structural data of the first schema structure according to the first schema structure and the second schema structure.

Alternatively, the restoration module 304 is further configured to judge whether the first schema structure and the second schema structure are consistent, process the source data into the structural data according to the first schema structure or the second schema structure when a judging result is that the first schema structure and the second schema structure are consistent, and determine differences of the first schema structure and the second schema structure and process the source data into structural data according to the first schema structure, the second schema structure and the differences when a judging result is that the first schema structure and the second schema structure are inconsistent.

Alternatively, the restoration module 304 is further configured to compare a first identification number of the first schema structure with a second identification number of the second schema structure. The first schema structure and the second schema structure are consistent if the first identification number is consistent with the second identification number, and the first schema structure and the second schema structure are inconsistent if the first identification number and the second identification number are inconsistent. The first identification number and the second identification number are uniformly assigned by a distributed storage schema management server.

Figure 4:
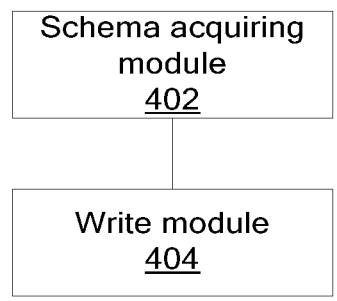
FIG. 4 is a structure schematic diagram showing a data processing device 2 of the distributed storage system according to embodiments of the disclosure.

Embodiments of the disclosure further provide a data processing device of a distributed storage system. FIG. 4 is a structure schematic diagram showing a data processing device 2 of the distributed storage system according to embodiments of the disclosure. As shown in FIG. 4, the device includes a schema acquiring module 402 configured to acquire a schema structure of the source data and an identification of the schema structure, where the source data are to-be-written data; and a write module 404 configured to write the source data into a storage space according to the schema structure, and write the identification into the storage space.

Alternatively, the schema acquiring module 402 is further configured to generate the schema structure, send the schema structure to a distributed storage schema management server, and receive the identification returned by the distributed storage schema management server according to the schema structure. Under the condition that the schema structure is matched in local existing schema structures by the distributed storage schema management server, the identification is a matched identification of the existing schema structures, otherwise the identification is the newly assigned identification.

Figure 5:
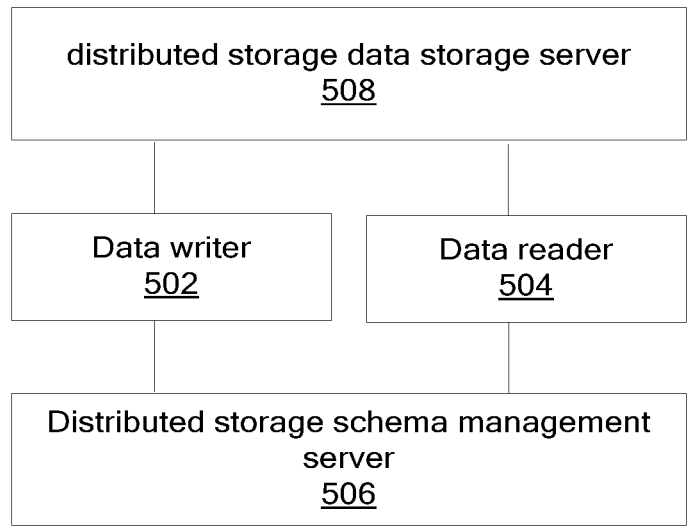
FIG. 5 is a structure schematic diagram showing a data processing system of a distributed storage system according to embodiments of the disclosure.

Embodiments of the disclosure further provide a data processing system of a distributed storage system. FIG. 5 is a structure schematic diagram showing a data processing system according to embodiments of the disclosure. As shown in FIG. 5, the system includes a distributed storage data storage server 508 configured to store data, a distributed storage schema management server 506 configured to manage the schema structure of the data, a data writer 502 which is equivalent to a data processing device 2 of the distributed storage system provided by embodiments above and is configured to write data into the distributed storage data storage server 508 according to the schema structure, and a data reader 504 which is equivalent to a data processing device 1 of the distributed storage system provided by embodiments above and is configured to read data from the distributed storage schema management server according to the schema structure.

Figure 6:
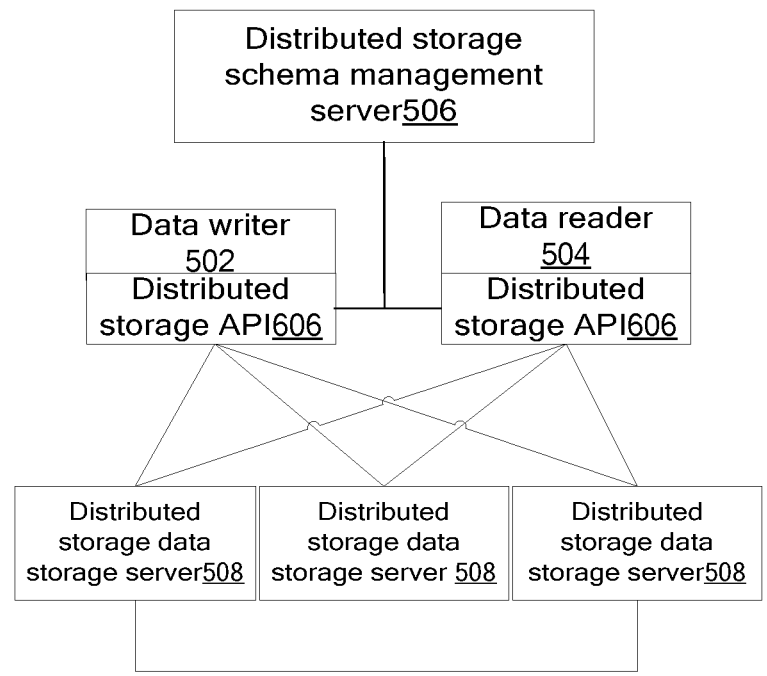
FIG. 6 is a structure schematic diagram showing a data processing system of a distributed storage system according to embodiments of the disclosure.

FIG. 6 is a structure schematic diagram showing a data processing system of a distributed storage system according to embodiments of the disclosure. As shown in FIG. 6, the system includes a data writer 502, a data reader 504, as well as a distributed storage API 606, a distributed storage schema management server 506 and a distributed storage data storage server 508. The data writer 502 and the data reader 504 interact with the distributed storage data storage server 508 and the distributed storage schema management server 506 via the distributed storage API 606.

Figure 7:
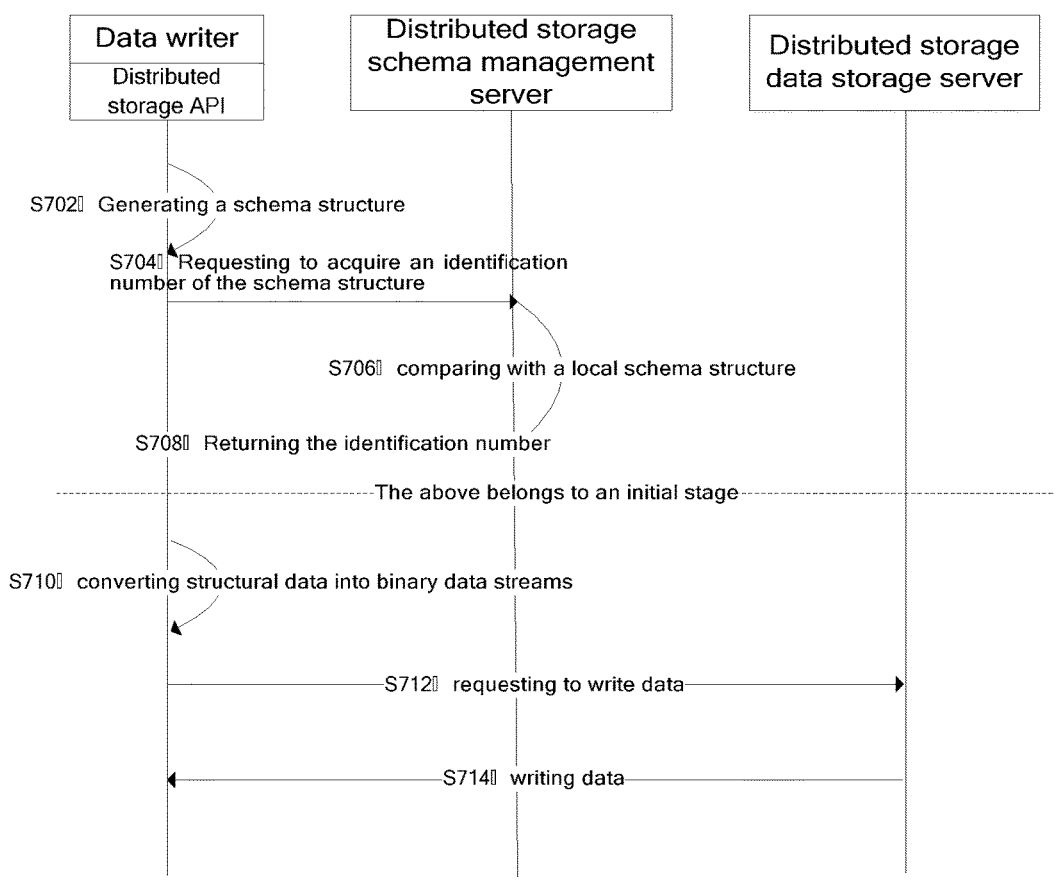
FIG. 7 is a flow diagram showing a processing method 1 for data of a distributed storage system according to embodiments of the disclosure.

FIG. 7 is a flow diagram showing a processing method 1 for data of a distributed storage system according to embodiments of the disclosure. In the present embodiment, the data processing system of the distributed storage system shown in FIG. 6 acts as an architecture. Taking writing data by the data writer as an example, as shown in FIG. 6 and FIG. 7, the flow includes following steps:

Step S702, generating a schema structure.

At an initial stage, the data writer 502 describes a schema structure of each element in data required to be used, namely to-be-written data, into a schema definition in text form, namely a schema structure of the to-be-written data, according to a certain grammar. The schema structure describes at least one of the following: a name, type and legal value range of each element, as well as an occurrence sequence, nest relation and the like of each element.

Step S704, requesting to acquire an identification number of the schema structure.

The data writer 502 submits the schema structure of the to-be-written data to the distributed storage schema management server 506 by the distributed storage API 606 so as to request to acquire the identification number of the schema structure.

Step S706, comparing with a local schema structure.

The distributed storage schema management server 506 matches the received schema structure of the to-be-written data with all locally maintained schema structures, stores the schema structure and newly assigns an identification number if a same schema structure is not matched locally, and searches out an identification number previously assigned to the schema structure if a same schema structure is matched.

Step S708, returning the identification number.

The distributed storage schema management server 506 returns the identification number to the data writer 502 via the distributed storage API 606.

The steps S702-S708 above belong to the initial stage.

Step S710, converting structural data into binary data streams.

The data writer 502 calls the distributed storage API 606 to convert to-be-written structural data into binary data streams according to a certain rule. With regard to the rule, number of bytes occupied by each element as well as binary representation forms of the elements are written in sequence according to an element sequence of the schema structure. If there is a nest relation between the elements, a conversion is carried out in a recursive mode.

Step S712, requesting to write data.

The data writer 502 sends a data writing request to the distributed storage data storage server 508 via the distributed storage API 606, so as to submit converted binary data streams to the distributed storage data storage server 508. The identification number of the schema structure, based on which binary data streams are stored, is carried in the data writing request.

Step S714, writing data.

The distributed storage data storage server 508 stores the binary data streams and their identification number, and notifies the data writer 502 that data are written successfully via the distributed storage API 606 after storage.

Figure 8:
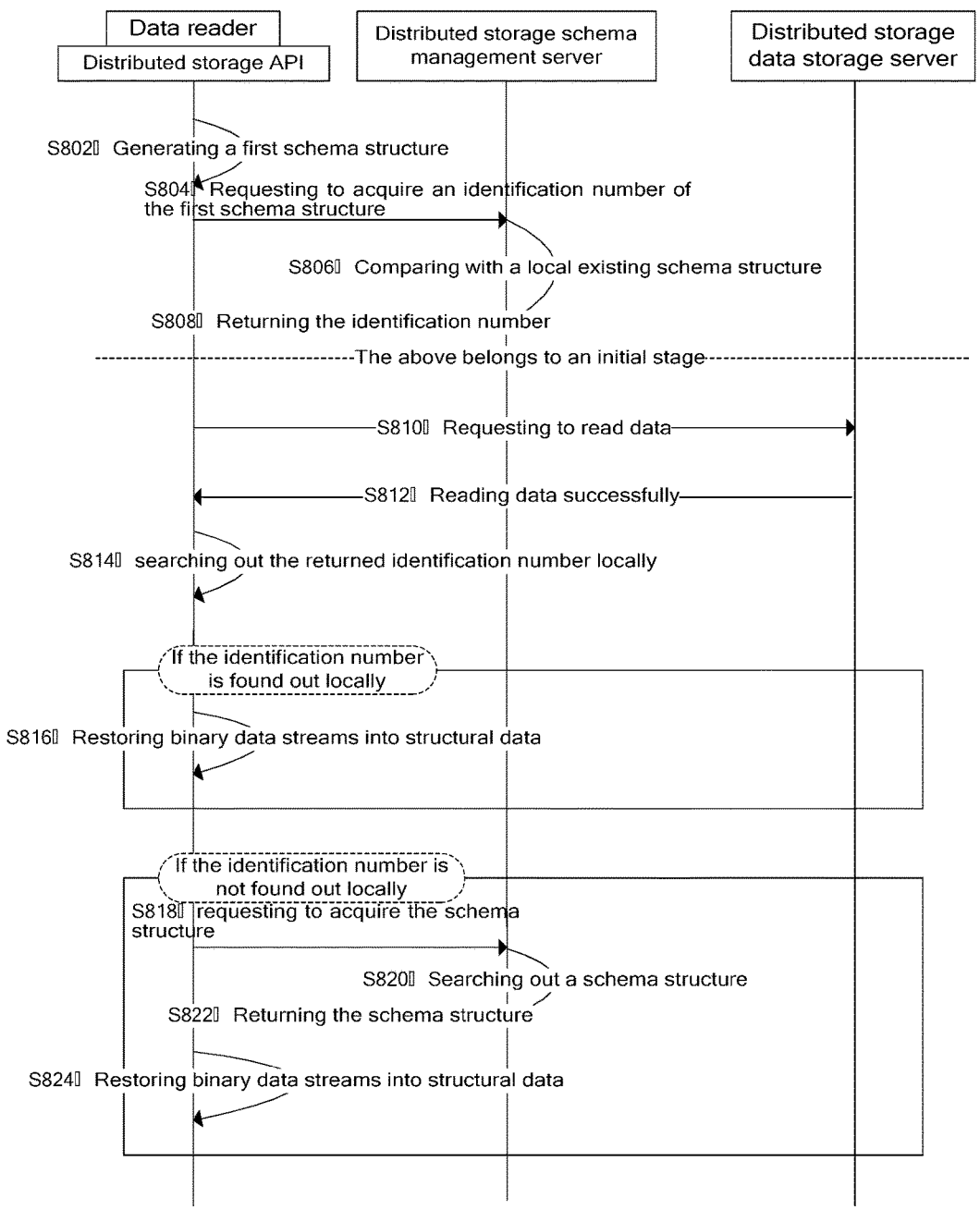
FIG. 8 is a flow diagram showing a processing method 2 for data of the distributed storage system according to embodiments of the disclosure.

FIG. 8 is a flow diagram showing a processing method 2 for data of the distributed storage system according to embodiments of the disclosure. In the present embodiment, the data processing system of the distributed storage system shown in FIG. 6 acts as an architecture. Taking reading data by the data reader as an example, as shown in FIG. 6 and FIG. 8, the flow includes following steps:

Step S802, generating a first schema structure.

At an initial stage, the data reader 504 describes a schema structure of each element in data required to be used, namely target data, into a schema definition in text form, namely the first schema structure, according to a certain grammar. Of course, in other embodiments, the schema definition can also be described as other forms according to other rules.

Step S804, requesting to acquire an identification number of the first schema structure.

The data reader 504 submits the first schema structure to the distributed storage schema management server 506 via the distributed storage API 606;

Step S806, comparing with a local existing schema structure.

The distributed storage schema management server 506 matches the received first schema structure with locally maintained existing schema structures, newly assigns an identification number to the data reader 504 if a same schema structure is not matched locally; and searches out an identification number previously assigned to the schema structure, and assigns the identification number to the data reader 504 if a same schema structure is matched locally.

Step S808, returning the identification number.

The distributed storage schema management server 506 returns the identification number to the data reader via the distributed storage API 606.

The steps S802-S808 above belong to the initial stage.

Step S810, requesting to read data.

The data reader 504 sends a data reading request to the distributed storage schema management server 506 via the distributed storage API 606.

Step S812, reading data successfully.

The distributed storage data storage server 508 returns binary data streams and a corresponding identification number of the schema structure to the distributed storage API 606.

Step S814, searching out the returned identification number locally.

The distributed storage API 606 searches out the returned identification number in locally stored identification numbers. The locally stored identification numbers are acquired in the step S808. If the returned identification number is found out locally, the step S816 is executed, otherwise the step S808 is executed.

Step S816, restoring binary data streams into structural data.

The distributed storage API 606 restores read binary data streams into structural data according to the schema structure corresponding to the determined identification number, and returns the structural data to the data reader 504.

Step S818, requesting to acquire the schema structure.

The distributed storage API 606 sends a schema structure acquiring request to the distributed storage schema management server 506, where the request carries the identification number acquired in the step S812.

Step S820, searching out a schema structure.

The distributed storage schema management server 506 searches a schema structure corresponding to the identification number according to the identification number carried in the request after receiving the schema structure acquiring request.

Step S822, returning the schema structure.

The distributed storage schema management server 506 returns the found schema structure to the distributed storage API 606. The found schema structure corresponds to the second schema structure, namely a schema structure adopted when the data writer writes corresponding source data.

Step S824, restoring binary data streams into structural data.

The distributed storage API 606 restores read binary data streams into structural data according to the schema structure returned by the distributed storage schema management server 506, and returns the structural data to the data reader 504.

In the step S816 and the step S824 of the present embodiment, if the identification number corresponding to the binary data streams is consistent with a certain identification number acquired from the distributed storage schema management server 506 at the initial stage, it means that an original local schema structure, namely a first schema structure, is completely consistent with a schema structure of a writer of the binary data streams, namely a second data schema structure. At this moment, the binary data streams can be restored into the structural data according to the first schema structure. A particular method may include: directly reading number of bytes and binary data with corresponding length from the binary data streams sequentially according to a local element sequence, and mapping to elements of local structural data so as to complete restoration. Restoration is carried out in a recursive mode if there is a nest relation between the elements.

If the identification number corresponding to the binary data streams in the step of S816 and the step of S824 is inconsistent with the identification number acquired from the distributed storage schema management server 506 at the initial stage, the distributed storage API 606 needs to compare the original local structure, namely the first schema structure, with a schema definition corresponding to the binary data streams, namely the second schema structure, to find whether there is an increasement or loss of elements, whether sequences of elements are consistent and the like, and then the binary data streams are restored according to the schema structure of the writer, namely the schema structure of second data, and each element of the binary data streams is mapped to elements with a same name and type of the local structural data, so as to finally complete restoration. If there are fields not required locally in the second schema structure, these fields can be automatically neglected during processing of the distributed storage API 606; otherwise, if fields required locally are not existed in the second schema structure, the distributed storage API 606 will automatically fill up with default values.

For instance, taking a typical scene as an example, in a first version of a program for processing user information, a schema structure of user information data is composed of name, telephone and address, and a batch of data are stored; and fields are increased in a second version, a schema structure of user information is composed of name, age, telephone and address. Because the schema structure is changed, the first version and the second version cannot recognize data of each other correctly if no treatment regarding compatibility is carried out. After technical schemes of the present embodiment is adopted, newly increased fields are neglected automatically when the first version reads data generated by the second version; and the newly increased fields are automatically filled up with default values when the second edition reads data generated by the first version, thereby achieving effect of schema-free.

Figure 9:
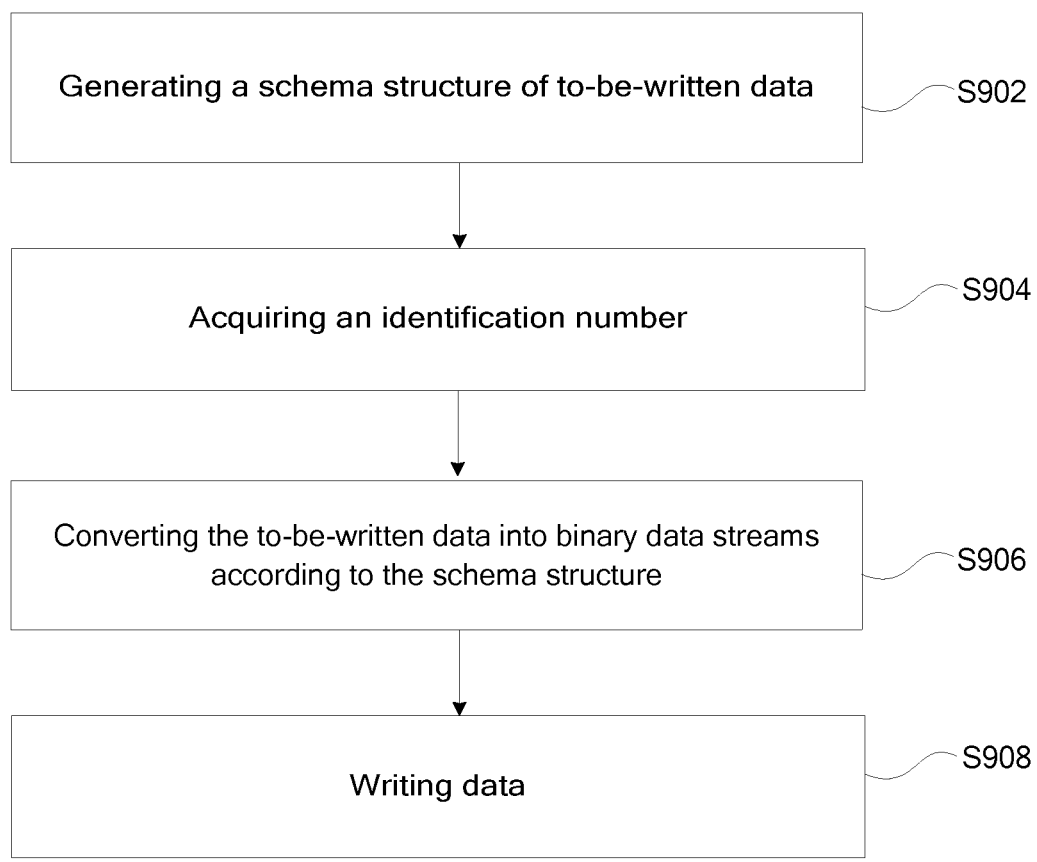
FIG. 9 is a flow diagram showing a processing method 3 for data of the distributed storage system according to embodiments of the disclosure.

FIG. 9 is a flow diagram showing a processing method 3 for data of the distributed storage system according to embodiments of the disclosure. A data writer is taken as an example in the present embodiment as shown in FIG. 9, and the flow includes following steps:

Step S902, generating a schema structure of to-be-written data.

A schema structure of each element in data to be used is described as a text according to a certain grammar, the text hereof is named a schema definition, namely a schema structure of to-be-written data, and the schema structure mainly includes name, type, legal value range, nest relation and the like of each element in the data schema structure.

Step S904, acquiring an identification number.

The schema structure of to-be-written data is submitted to a schema administration module of the distributed storage system so as to obtain an unique identification number assigned by the schema administration module of the distributed storage system to the schema structure. As for a same schema structure, a same identification number would be returned.

Step S906, converting the to-be-written data into binary data streams according to the schema structure.

The to-be-written data are converted into the binary data streams according to the schema structure of the to-be-written data.

Step S908, writing data.

The to-be-written data and the unique identification number corresponding to the schema structure of the to-be-written data are stored into the distributed storage system.

Figure 10:
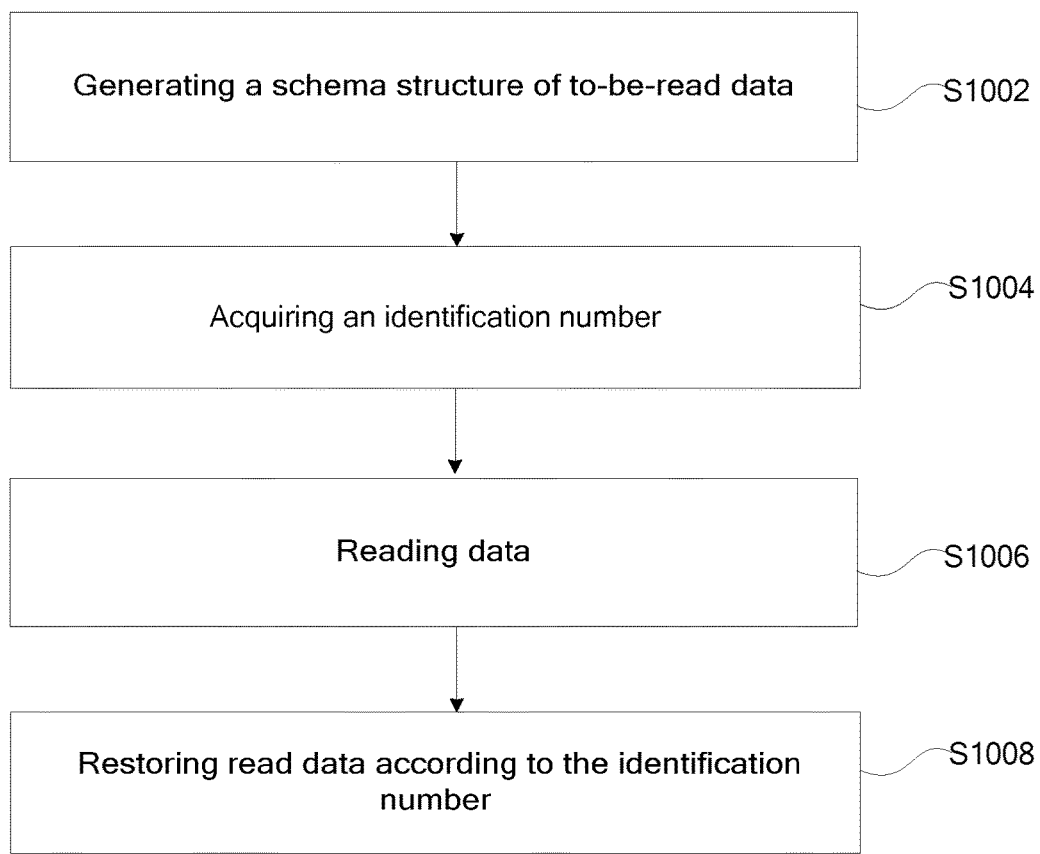
FIG. 10 is a flow diagram showing a processing method 4 for data of the distributed storage system according to embodiments of the disclosure.

FIG. 10 is a flow diagram showing a processing method 4 for data of the distributed storage system according to embodiments of the disclosure. A data reader is taken as an example in the present embodiment as shown in FIG. 10, and the flow includes following steps:

Step S1002, generating a schema structure of to-be-read data.

A schema structure of each element of data to be used, namely target data, is described as a schema definition of a text, namely the first schema structure. A particular schema definition is described as above, and will not be described here in detail.

Step S1004, acquiring an identification number.

The first schema structure is submitted to the schema administration module of the distributed storage system so as to obtain an unique identification number assigned by the schema management module of the distributed storage system to the first schema structure. As for a same schema structure, a same identification number would be returned.

Step S1006, reading data.

Binary data streams and the unique identification number of the schema structure corresponding to the binary data streams are read from the distributed storage system. The identification number is written simultaneously with the binary data streams while writing data.

Step S1008, restoring read data according to the identification number.

If the acquired unique identification number is same as an identification number of a certain local schema structure, the read binary data streams are restored into structural data by using a data restoration mode of the local schema structure. If the acquired unique identification number is not same as any identification number of the local schema structure, a schema structure corresponding to the identification number, namely the second schema structure, is acquired from the schema management module of the distributed storage system, and is compared with the first schema structure, and the two schema structures are combined so as to restore the read binary data streams.

It is observed from the description above that following technical effect is realized by embodiments of the disclosure. In a non-relational distributed storage system, embodiments of the disclosure solve problems of limitation in aspects of running efficiency, data representation and the like as well as schema-free in the prior art by using technical features such as centrally managing schema structures, comparing while analysing schema structures and the like, so that structural data of different versions is compatible even if there are different schema structures, and requirements of scenes of a distributed application system such as online updating and the like can be met well. Embodiments of the disclosure are suitable for achieving a schema-free property of data in the distributed storage system.

Apparently, it should be understood that each module or each step of the disclosure can be realized by a general computing device, can be concentrated in a single computing device, or distributed on a network consisting of a plurality of computing devices, and optionally can be realized by executable program codes by the computing devices, thereby being stored in a storage device to be executed by the computing devices, and under certain circumstances, the shown or described steps can be executed in the sequence different from this point, or each module or step can be respectively used for manufacturing each integrated circuit module, or multiple modules or steps therein can be used for manufacturing a single integrated circuit module. Therefore, the disclosure is not limited to the combination of any specific hardware and software.

The foregoing descriptions are merely embodiments of the present disclosure, rather than limiting the present disclosure. Any skilled person in the art could readily think of variations and modifications. Any modification, equivalent substitution, improvement and the like within the spirit and principle of the present disclosure shall fall within the protection scope of the present disclosure.

INDUSTRIAL APPLICABILITY

As mentioned above, the processing method, device and system for data of the distributed storage system provided by embodiments of the disclosure have following beneficial effects. In a non-relational distributed storage system, problems of limitation in aspects of running efficiency, data representation and the like as well as schema-free in the prior art are solved by using technical features such as centrally managing schema structures, comparing while analysing schema structures and the like, so that structural data of different versions is compatible even if there are different schema structures, and requirements of scenes of a distributed application system such as online updating and the like can be met well. Embodiments of the disclosure are suitable for achieving a schema-free property of data in the distributed storage system.

What is claimed is:

1. A processing method for data of a distributed storage system performed by a processor, comprising:
   acquiring a first schema structure of target data and a second schema structure of source data; and
   processing the source data into structural data of the first schema structure according to the first schema structure and the second schema structure; wherein
   processing the source data into structural data of the first schema structure according to the first schema structure and the second schema structure comprises:
   judging whether the first schema structure and the second schema structure are consistent;
   processing the source data into the structural data according to the first schema structure or the second schema structure when a judging result is that the first schema structure and the second schema structure are consistent; and
   determining differences between the first schema structure and the second schema structure, and processing the source data into structural data according to the first schema structure, the second schema structure and the differences when the judging result is that the first schema structure and the second schema structure are inconsistent; wherein
   judging whether the first schema structure and the second schema structure are consistent comprises:
   comparing a first identification number of the first schema structure with a second identification number of the second schema structure, wherein
   the first schema structure and the second schema structure are consistent if the first identification number is consistent with the second identification number;
   the first schema structure and the second schema structure are inconsistent if the first identification number and the second identification number are inconsistent, and the first identification number and the second identification number are uniformly assigned by a distributed storage schema management server.

2. The method according to claim 1, wherein, the first schema structure is a text description to schema structures of each element in the target data, and the second schema structure is a text description to schema structures of each element in the source data.

3. The method according to claim 2, wherein,
   the text description of the first schema structure comprises at least one of the following: names of each element in the target data, types of each element in the target data, legal value ranges of each element in the target data, nest relations of each element in the target data, and a sequence of each element in the target data, and/or
   the text description of the second schema structure comprises at least one of the following: names of each element in the source data, types of each element in the source data, legal value ranges of each element in the source data, nest relations of each element in the source data, and a sequence of each element in the source data.

4. The method according to claim 1, wherein
   when data are written in a storage space of the distributed storage system, the target data are data supported by the storage space, and the source data are to-be-written data; and/or
   when data are read from the storage space, the target data are data to be obtained by reading, and the source data are data stored in the storage space.

5. A data processing device of a distributed storage system, comprising a processor and a storage device, wherein the storage device stores processor-executable programs, and the programs comprise:
   an acquiring module configured to acquire a first schema structure of target data and a second schema structure of source data; and
   a restoration module configured to process the source data into structural data of the first schema structure according to the first schema structure and the second schema structure; wherein
   the restoration module is further configured to judge whether the first schema structure and the second schema structure are consistent, process the source data into the structural data according to the first schema structure or the second schema structure when a judging result is that the first schema structure and the second schema structure are consistent, and determine differences of the first schema structure and the second schema structure and process the source data into structural data according to the first schema structure, the second schema structure and the differences when a judging result is that the first schema structure and the second schema structure are inconsistent; and
   the restoration module is further configured to compare a first identification number of the first schema structure with a second identification number of the second schema structure, wherein the first schema structure and the second schema structure are consistent if the first identification number is consistent with the second identification number, and the first schema structure and the second schema structure are inconsistent if the first identification number and the second identification number are inconsistent, and the first identification number and the second identification number are uniformly assigned by a distributed storage schema management server.

* * * * *